C. F. HETHERINGTON.
CLUTCH.
APPLICATION FILED JULY 26, 1912.

1,106,563.

Patented Aug. 11, 1914.

Witnesses
Frank A. Fahle
Josephine Casper

Inventor
Carl F. Hetherington,
By Arthur M. cLeod
Attorney

UNITED STATES PATENT OFFICE.

CARL F. HETHERINGTON, OF INDIANAPOLIS, INDIANA.

CLUTCH.

1,106,563.  Specification of Letters Patent.  Patented Aug. 11, 1914.

Application filed July 26, 1912. Serial No. 711,624.

*To all whom it may concern:*

Be it known that I, CARL F. HETHERINGTON, a citizen of the United States, residing at Indianapolis, in the county of Marion and State of Indiana, have invented a new and useful Clutch, of which the following is a specification.

It is the object of my invention to provide a clutch, especially for use in connection with winding drums, in which the bearings are relieved from any strain due to the setting and releasing of the clutch, and in which the clutch-operating means practically requires no additional space.

The accompanying drawings illustrate my invention.

Figure 1:
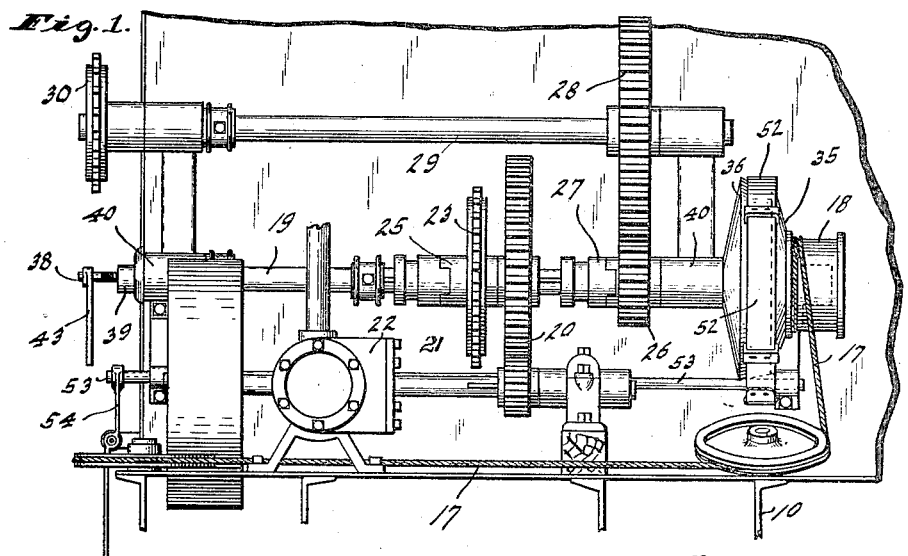
Figure 2:
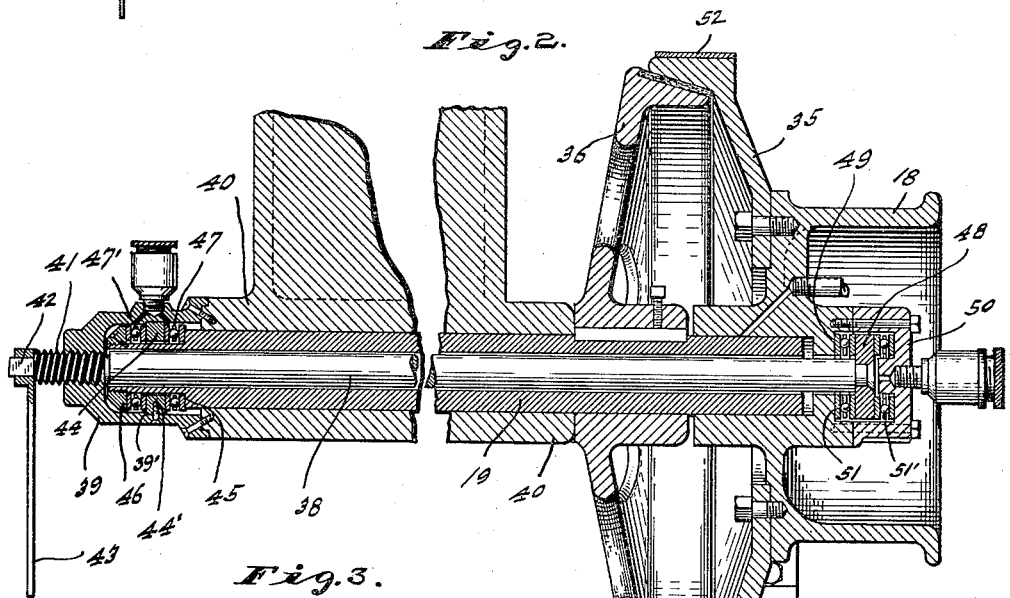
Figure 3:
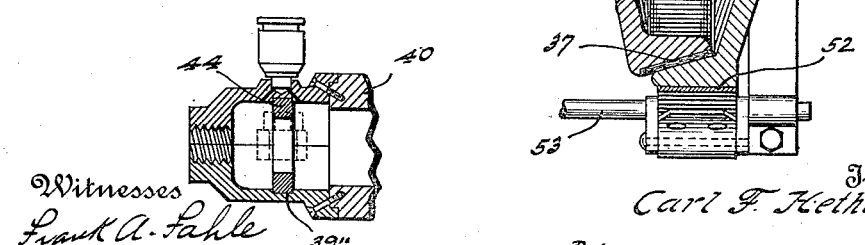

In these drawings, Figure 1 is a partial end elevation of an operating mechanism, showing an embodiment of my improved clutch; Fig. 2 is a longitudinal section, with some parts broken away, of the clutch and its operating mechanism; and Fig. 3 shows a modified form of mounting for the thread ring.

A winding drum 18, for a rope or cable 17, is loosely mounted on a shaft 19, which is driven through suitable gearing 20 from the crank shaft 21 of a driving engine 22. A sprocket wheel 23 and a pinion 26 may also be loosely mounted on the shaft 19, if desired, being connectible to said shaft by ordinary tooth clutches 25 and 27 respectively. The winding drum 18 is connected to one member 35 of a friction clutch, the other member 36 of such clutch being keyed to the shaft 19. The two members 35 and 36 preferably interfit conically, suitable friction material 37 being located between their coöperating surfaces. The shaft 19 is hollow, and extending lengthwise through it is a rod 38, which, at the end of the shaft opposite the drum 18, extends through and has a threaded engagement with a cap 39 fastened on the end of one of the bearings 40 for the shaft 19. The projecting end of the rod 38, beyond its threaded portion 41, is preferably squared at 42 to receive an operating handle 43. A thrust ring 44 is fixed on the inside of the cap 39, between a shoulder 45 on the shaft 19 and a collar 46 fixed on the end of such shaft, the ring 44 being separated from the shoulder 45 and the collar 46 by suitable ball bearings 47 and 47' respectively. The thrust ring may be set in the cap 39 against a shoulder 39' and held by screws 44' if the cap is of one piece, as shown in Fig. 2, or in a groove 39'' if the cap is made of two pieces, as shown in Fig. 3. In either case the cap 39 is an abutment against which the shaft 19 and the rod 38 act equally and oppositely axially of the shaft.

On the end of the rod 38 opposite the handle 33 is fixed, as by riveting and welding, a collar 48, which is located between a shoulder 49 on the hub of the winding drum 18 and a cap 50 fastened to said hub, the collar 48 being separated from the shoulder 49 and the cap 50 by suitable ball bearings 51 and 51' respectively. A brake band 52 coöperates with the exterior surface of the clutch member 35, and may be moved to clamping or unclamping position by turning a brake rod 53 provided with a suitable operating handle 54, which is conveniently located near the handle 43.

During the operation of the plant, the engine 22 ordinarily remains in continuous operation. When it is desired to wind up the cable 17, the handle 54 is moved to release the brake band 52 and the handle 43 is operated to pull the rod 38 toward the cap 39, this rod thus being a tension member. This pull is transmitted through the collar 48 and the ball bearings 51 to the shoulder 49 and hub of the drum 18, and thence to the clutch member 35, moving the latter toward the clutch member 36 to set the clutch formed by said two members. The resultant strain on the clutch member 36 is transmitted to the shaft 19, and through it and its shoulder 45, the ball bearings 47, and the ring 44 to the cap 39, upon which an equal and opposite force is exerted by the reaction due to the pull of the threaded portion 41 of the rod 38. Thus the strain of setting the clutch 35—36 does not reach the bearings 40.

When the cable 17 has been wound up sufficiently, the handle 43 is moved in the opposite direction, or in a direction to move the rod 38 away from the cap 39. This push is transmitted through collar 48, the ball bearings 51', and the cap 50 to the winding drum 18, and through it to the clutch member 35, moving the latter to the right. Any strain, which is comparatively slight compared with that exerted upon the setting of the clutch, thus exerted on the clutch member 36 is transmitted through it as a pull to the shaft 19, and thence through the collar 46, ball bearings 47', and ring 44 to the cap 39, upon which there is an equal and opposite reaction from the threaded part 41 of the rod 38. Thus also upon releasing the clutch there is no strain on the bearings 40.

In order to prevent the cable 17 from unwinding after the clutch 35—36 has been released, the brake band 52 may be set by the proper operation of the handle 54. To allow such unwinding this brake band is released, being re-set when the desired unwinding has taken place.

I claim as my invention:

1. In combination, a hollow shaft, a clutch member fixed thereon, a second clutch member coöperating with the first clutch member and loosely mounted on the shaft, a rod projecting through said hollow shaft and provided with a shoulder which coöperates with the second clutch member to move the latter axially of the shaft, and a stationary member with which said rod has a threaded engagement, said stationary member being provided with a shoulder coöperating with said shaft to take axial thrust therefrom.

2. In combination, a hollow shaft, a clutch member fixed thereon, a second clutch member coöperating with the first clutch member and loosely mounted on the shaft, a rod projecting through said hollow shaft and provided with a shoulder which coöperates with the second clutch member to move the latter axially of the shaft, ball bearings between said shoulder and said second clutch member, a stationary member with which said rod has a threaded engagement, said stationary member being provided with a shoulder coöperating with said shaft to take axial thrust therefrom, and ball bearings between said last named shoulder and said shaft.

3. In combination, a hollow shaft, a clutch member fixed thereon, a second clutch member coöperating with the first clutch member and loosely mounted on the shaft, a hollow winding drum fixed to said second clutch member, a rod projecting through said hollow shaft and provided within said drum with a shoulder which coöperates with the second clutch member to move the latter axially of the shaft, and a stationary member with which said rod has a threaded engagement, said stationary member being provided with a shoulder coöperating with said shaft to take axial thrust therefrom.

4. In combination, a hollow shaft, a clutch member fixed thereon, a second clutch member coöperating with the first clutch member and loosely mounted on the shaft, a hollow winding drum fixed to said second clutch member, a rod projecting through said hollow shaft and provided within said drum with a shoulder which coöperates with the second clutch member to move the latter axially of the shaft, ball bearings between said shoulder and said second clutch member, a stationary member with which said rod has a threaded engagement, said stationary member being provided with a shoulder coöperating with said shaft to take axial thrust therefrom, and ball bearings between said last named shoulder and said shaft.

5. In combination, a hollow shaft, a clutch member fixed thereon, a second clutch member coöperating with the first clutch member and loosely mounted on the shaft, a rod projecting through said hollow shaft and provided with a shoulder which coöperates with the second clutch member to move the latter axially of the shaft, ball bearings between said shoulder and said second clutch member, a stationary member having an operative connection with said rod whereby the latter may be moved endwise relatively to said stationary member, said stationary member being provided with a shoulder coöperating with said shaft to take axial thrust therefrom, and ball bearings between said last named shoulder and said shaft.

6. In combination, a shaft, bearings therefor, a clutch having one member fixed on said shaft and the other member loosely mounted on said shaft, a member movable lengthwise of said shaft to move said two clutch members positively both into and out of clutching engagement, said shaft being freely rotatable independently of said member, and means whereby the complete axial stress due to the setting of the clutch is transmitted to said shaft and taken thereby independently of and without affecting the bearings for the shaft.

7. In combination, a shaft, bearings therefor, a clutch having one member rotatively fixed on said shaft and the other member rotatable on said shaft, a shift member movable lengthwise of said shaft to move relatively said two clutch members positively both into and out of clutching engagement, said shaft being freely rotatable independently of said shift member, and means whereby such shift member may be positively moved lengthwise of the shaft in either direction by creating axial stresses which are wholly independent of the bearings.

8. In combination, a shaft, a clutch having one member rotatively fixed on said shaft and the other member rotatable on said shaft, a shift member movable lengthwise of said shaft to move relatively said two clutch members positively both into and out of clutching engagement, and means for moving said shift member lengthwise of the shaft to set the clutch and for transmitting to the shaft all the axial stresses involved in producing such movement, said shaft being rotatable independently of said means.

9. In combination, a shaft, a clutch having one member rotatively fixed on said shaft and the other member rotatable on said shaft, a shift member movable lengthwise of said shaft to move relatively said two clutch members positively both into and out of clutching engagement, said shaft being freely rotatable independently of said shift member, and means for moving said shift member lengthwise of the shaft to set the clutch and for transmitting to the shaft all the axial stresses involved in producing such movement.

10. In combination, two clutch members, a shift member extending axially through said clutch members and independently of which both clutch members are rotatable, and actuating means for moving said shift member and one of the clutch members axially relatively to the other clutch member both to set and to release the clutch, and for transmitting to said shift member all the axial stresses produced by the setting of the clutch.

11. In combination, two clutch members, a shift member extending axially through said clutch members, and actuating means for moving said shift member and one of the clutch members axially relatively to the other clutch member both to set and to release the clutch, and for transmitting to said shift member all the axial stresses produced by the setting of the clutch, both of said clutch members being rotatable relatively to said actuating means without changing the setting of the clutch.

12. In combination, a shaft, a clutch having one member rotatably fixed on said shaft and the other member rotatable on said shaft, a tension member extending axially within said shaft and connected to said second clutch member to lock the two clutch members together when said tension member is put under tension, and means for putting said tension member under tension by creating axial stresses in said shaft which furnish the entire reaction for the stresses in said tension member, said shaft being rotatable independently of said means.

13. In combination, a shaft, a clutch having one member rotatably fixed on said shaft and the other member rotatable on said shaft, a rod extending through said shaft and connected to said second clutch member so that axial movement of said rod causes clutching or unclutching of the clutch, and an abutment upon which said shaft and said rod act equally and oppositely axially of the shaft, the connection between the shaft and rod through the abutment including two members movable relatively to each other axially on the shaft and independently of which the shaft is rotatable.

In witness whereof, I have hereunto set my hand and seal at Indianapolis, Indiana, this 20th day of July, A. D. one thousand nine hundred and twelve.

CARL F. HETHERINGTON. [L. S.]

Witnesses:
FRANK A. FAHLE,
JOSEPHINE GASPER.

---

Copies of this patent may be obtained for five cents each, by addressing the "Commissioner of Patents, Washington, D. C."